(12) United States Patent
Christensen et al.

(10) Patent No.: US 10,360,053 B1
(45) Date of Patent: Jul. 23, 2019

(54) SYSTEMS AND METHODS FOR COMPLETING SETS OF COMPUTING TASKS

(71) Applicant: Veritas Technologies LLC, Mountain View, CA (US)

(72) Inventors: Aaron Christensen, Apple Valley, MN (US); Kirk Searls, Blairsville, GA (US)

(73) Assignee: Veritas Technologies LLC, Santa Clara, CA (US)

( * ) Notice: Subject to any disclaimer, the term of this patent is extended or adjusted under 35 U.S.C. 154(b) by 80 days.

(21) Appl. No.: 15/432,582

(22) Filed: Feb. 14, 2017

(51) Int. Cl.
*G06F 9/455* (2018.01)
*G06F 9/46* (2006.01)
(Continued)

(52) U.S. Cl.
CPC .............. *G06F 9/455* (2013.01); *G06F 8/60* (2013.01); *G06F 9/44505* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4831* (2013.01); *G06F 9/4843* (2013.01); *G06F 9/4881* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5038* (2013.01); *G06F 9/5044* (2013.01);
(Continued)

(58) Field of Classification Search
CPC .. G06F 9/455; G06F 9/45533; G06F 9/45558; G06F 2009/45562; G06F 2009/45575; G06F 9/48; G06F 9/4806; G06F 9/4843; G06F 9/485; G06F 9/4881; G06F 9/50; G06F 9/5005; G06F 9/5011; G06F 9/5016; G06F 9/5022; G06F 9/5027; G06F 9/5038; G06F 9/5044; G06F 9/5055; G06F 9/5061; G06F 9/5072; G06F 9/5077; G06F 9/5083
See application file for complete search history.

(56) References Cited

U.S. PATENT DOCUMENTS 9,176,720 B1    11/2015    Day-Richter et al.
9,256,467 B1 *    2/2016    Singh .................... G06F 9/5055
(Continued)

OTHER PUBLICATIONS

Apache Mesos, http://mesos.apache.org, last accessed Jan. 25, 2017.
(Continued)

*Primary Examiner* — Charles M Swift
(74) *Attorney, Agent, or Firm* — FisherBroyles, LLP

(57) ABSTRACT

The disclosed computer-implemented method for completing sets of computing tasks may include (i) defining a set of computing tasks to be performed in a specified order, (ii) configuring a set of containers such that each container within the set of containers is configured to perform a task within the set of computing tasks, where each container isolates user space of a deployment system from other software on the deployment system while sharing kernel space with the other software, (iii) receiving a request to initiate the set of computing tasks, and (iv) completing, in response to the request, the set of computing tasks by launching the set of containers in the specified order. Various other methods, systems, and computer-readable media are also disclosed.

17 Claims, 5 Drawing Sheets

(51) Int. Cl.
*G06F 15/173* (2006.01)
*G06F 9/48* (2006.01)
*G06F 9/445* (2018.01)
*G06F 8/60* (2018.01)
*G06F 9/50* (2006.01)

(52) U.S. Cl.
CPC .......... *G06F 9/5055* (2013.01); *G06F 9/5061* (2013.01); *G06F 9/5072* (2013.01); *G06F 9/5077* (2013.01); *G06F 9/5083* (2013.01); *G06F 2009/45562* (2013.01); *G06F 2009/45575* (2013.01)

(56) References Cited

U.S. PATENT DOCUMENTS

| | | | |
|---|---|---|---|
| 9,367,305 | B1 | 6/2016 | Kumar |
| 9,983,891 | B1 | 5/2018 | Christensen |
| 2004/0148367 | A1 | 7/2004 | Takano |
| 2009/0210869 | A1* | 8/2009 | Gebhart ............... G06F 8/60 717/174 |
| 2011/0047525 | A1 | 2/2011 | Castellanos |
| 2011/0197188 | A1* | 8/2011 | Srinivasan ............ G06F 8/60 718/1 |
| 2014/0181816 | A1* | 6/2014 | Muller ............... G06F 9/5022 718/1 |
| 2014/0201374 | A1* | 7/2014 | Ashwood-Smith ..... H04L 49/70 709/226 |
| 2015/0120928 | A1* | 4/2015 | Gummaraju ........ H04L 67/1008 709/226 |
| 2015/0269006 | A1 | 9/2015 | Caufield |
| 2015/0363181 | A1* | 12/2015 | Alberti ............... G06F 9/45558 717/177 |
| 2016/0098285 | A1 | 4/2016 | Davis et al. |
| 2016/0162320 | A1* | 6/2016 | Singh ............... G06F 9/5055 718/1 |
| 2016/0182315 | A1* | 6/2016 | Salokanto ........... H04L 41/5054 709/226 |
| 2016/0378518 | A1* | 12/2016 | Antony ............ G06F 9/45533 718/1 |
| 2017/0115977 | A1 | 4/2017 | Kim |
| 2017/0228246 | A1 | 8/2017 | Kotha |
| 2017/0235609 | A1 | 8/2017 | Wires |
| 2017/0242617 | A1 | 8/2017 | Walsh |
| 2017/0264684 | A1 | 9/2017 | Spillane |
| 2017/0279797 | A1 | 9/2017 | Cross, Jr. |
| 2017/0322966 | A1* | 11/2017 | Tran ................... G06F 11/1458 |
| 2017/0337054 | A1 | 11/2017 | Parees |
| 2017/0344292 | A1 | 11/2017 | Sterin |
| 2018/0004570 | A1* | 1/2018 | Maupu ............... G06F 9/5038 |
| 2018/0129479 | A1 | 5/2018 | McPherson et al. |

OTHER PUBLICATIONS

AWS Lambda, https://aws.amazon.com/lambda/, last accessed Jan. 25, 2017.
Docker container support, last accessed Jan. 25, 2017.
Dray—Docker Workflow Engine, http://dray.it/, last accessed Jan. 25, 2017.
Docker ETL Rest server github, https://github.com/bmamlin/docker-etl-rest-server, last accessed Jan. 25, 2017.
Docker Nifi github, https://github.com/jdye64/docker-nifi, last accessed Jan. 25, 2017.
Mesos/Chronos github, https://github.com/mesos/chronos, last accessed Jan. 25, 2017.
Apache Nifi for Docker, https://github.com/apiri/dockerfile-apache-nifi, last accessed Jan. 25, 2017.
Coho Data, https://www.cohodata.com/intel, last accessed Jan. 25, 2017.
Iron.io https://www.iron.io/, last accessed Jan. 25, 2017.
Jenkins and Docker, https://www.cloudbees.com/continuous-delivery/jenkins-docker, last accessed Jan. 25, 2017.
Pachyderm.io, https://www.pachyderm.io/, last accessed Jan. 25, 2017.
Syncsort ETL, last accessed Jan. 25, 2017.
Talend and Docker, last accessed Jan. 25, 2017.
What is Docker?, https://www.docker.com/what-docker, last accessed Jan. 25, 2017.
Docker Swarm product overview, https://www.docker.com/products/docker-swarm, last accessed Feb. 28, 2017.
Kubernetes Basics, https://kubernetes.io/docs/tutorials/kubernetes-basics/, last accessed Feb. 28, 2017.
Attach a volume to a container while it is running; http://jpetazzo.github.io/2015/01/13/docker-mount-dynamic-volumes/, as accessed Feb. 23, 2017 (Jan. 13, 2015); Github.
Manage data in containers; https://docs.docker.com/engine/tutorials/dockervolumes/#/backup-restore-or-migrate-data-volumes, as accessed Feb. 23, 2017 (Sep. 3, 2016); Docker.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Understanding Volumes in Docker; http://container-solutions.com/understanding-volumes-docker/, as accessed Feb. 23, 2017 (Jul. 6, 2015); Container Solutions Amsterdam.
Docker mounting volumes on host; http://stackoverflow.com/questions/25311613/docker-mounting-volumes-on-host, as accessed Feb. 23, 2017 (Aug. 14, 2014); stackoverflow.
Understand images, containers, and storage drivers; https://docs.docker.com/engine/userguide/storagedriver/imagesandcontainers/, as accessed Feb. 23, 2017 (Nov. 7, 2015); Docker.
A Not Very Short Introduction to Docker; https://blog.jayway.com/2015/03/21/a-not-very-short-introduction-to-docker/, as accessed Feb. 23, 2017 (Mar. 21, 2015); jayway.
Use data volume containers; https://getcarina.com/docs/tutorials/data-volume-containers/, as accessed Feb. 23, 2017 (Oct. 23, 2015); Rackspace.
What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker; as accessed Jan. 28, 2017.
Platform as a Service; https://en.wikipedia.org/wiki/Platform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; https://cloud.google.com/solutions/real-time/kubernetes-redis-bigquery; as accessed Jan. 28, 2017.
Operating-system-level virtualization; https://en.wikipedia.org/wiki/Operating-system-level_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/container-engine/docs/clusters/#what_is_a_container_cluster; as accessed Jan. 31, 2017.
Object Storage; https://en.wikipedia.org/wiki/Object_storage; as accessed Jan. 30, 2017.
Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.
plugins_volume.md; https://github.com/docker/docker/blob/master/docs/extend/plugins_volume.md, as accessed on Feb. 14, 2017.

(56) References Cited

OTHER PUBLICATIONS

Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.
Kasireddy, Preethi, "A Beginner-Friendly Introduction to Containers, VMs and Docker," accessed at https://medium.freecodecamp.org/a-beginner-friendly-introduction-to-containers-vms-and-docker-79a9e3e119b, published on Mar. 4, 2016, pp. 21.

* cited by examiner

SYSTEMS AND METHODS FOR COMPLETING SETS OF COMPUTING TASKS

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers may reduce the processing requirements for each application, allowing a greater number of applications to be run on the same host. Containers can be used for anything from short-lived operations lasting minutes to long-lived operations lasting weeks or months, and can be configured to run a wide variety of applications in order to complete a wide variety of computing tasks.

Traditional systems for using containers to complete computing tasks may have a low degree of automation, requiring a user to manually configure and launch each container. Some traditional systems for launching containers may not be capable of linking containers together, making it difficult to complete related computing tasks using more than one container. The instant disclosure, therefore, identifies and addresses a need for systems and methods for completing sets of computing tasks.

SUMMARY

As will be described in greater detail below, the instant disclosure describes various systems and methods for completing sets of computing tasks.

In one example, a computer-implemented method for completing sets of computing tasks may include (i) defining a set of computing tasks to be performed in a specified order, (ii) configuring a set of containers such that each container within the set of containers is configured to perform a task within the set of computing tasks, where each container isolates user space of a deployment system from other software on the deployment system while sharing kernel space with the other software, (iii) receiving a request to initiate the set of computing tasks, and (iv) completing, in response to the request, the set of computing tasks by launching the set of containers in the specified order.

In some examples, launching the set of containers in the specified order may include launching, by a container in the set of containers, at least one other container in the set of containers. In some embodiments, the container may include a container identifier and the container may launch the other container by assigning a context identifier to the other container that includes the container identifier. In one embodiment, the other container may launch an additional container within the set of containers by assigning a context identifier to the additional container that includes the context identifier of the other container. Additionally or alternatively, the launching container may not include an assigned context identifier and the launching container may assign the context identifier that includes the container identifier to the other container instead of assigning the assigned context identifier to the other container as a context identifier in response to determining that the container does not include the assigned context identifier.

In some examples, launching the set of containers in the specified order may include launching an external resource that is not contained within any container in the set of containers. In some embodiments, launching the external resource may include launching, by a container in the set of containers, the external resource. In some examples, completing the set of tasks may include launching, by at least one container in the set of containers, an interface that prompts a user to provide input and receiving, from the user via the interface, the input.

In one embodiment, a system for implementing the above-described method may include (i) a definition module, stored in memory, that defines a set of computing tasks to be performed in a specified order, (ii) a configuration module, stored in memory, that configures a set of containers such that each container within the set of containers is configured to perform a task within the set of computing tasks, where each container isolates user space of a deployment system from other software on the deployment system while sharing kernel space with the other software, (iii) a receiving module, stored in memory, that receives a request to initiate the set of computing tasks, (iv) a completion module, stored in memory, that completes, in response to the request, the set of computing tasks by launching the set of containers in the specified order, and (v) at least one physical processor configured to execute the definition module, the configuration module, the receiving module, and the completion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) define a set of computing tasks to be performed in a specified order, (ii) configure a set of containers such that each container within the set of containers is configured to perform a task within the set of computing tasks, where each container isolates user space of a deployment system from other software on the deployment system while sharing kernel space with the other software, (iii) receive a request to initiate the set of computing tasks, and (iv) complete, in response to the request, the set of computing tasks by launching the set of containers in the specified order.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
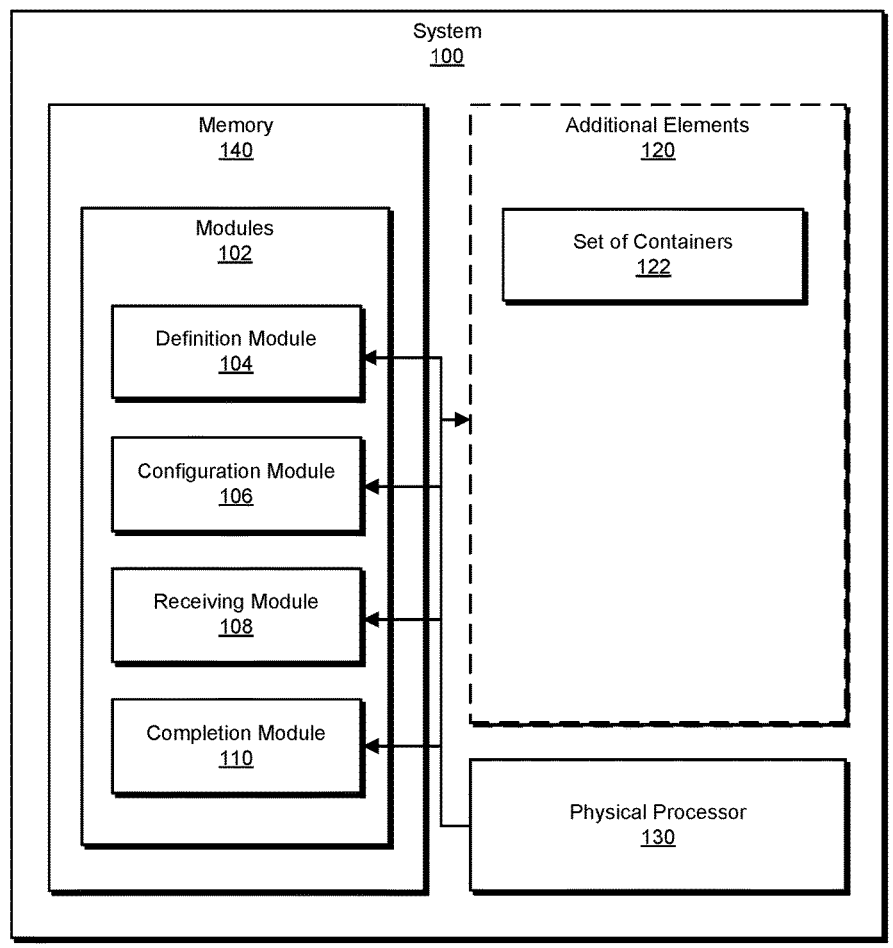
FIG. 1 is a block diagram of an example system for completing sets of computing tasks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for completing sets of computing tasks. As will be explained in greater detail below, by configuring a set of containers to complete a set of computing tasks in a specified order, the systems and methods described herein may be able to streamline the completion of commonly-repeated sets of computing tasks. By using containers to perform sets of tasks in this way, the systems and methods described herein may be able to improve the efficiency of the process from a user perspective as well as increase the efficiency of the record-keeping related to the completed tasks. In addition, the systems and methods described herein may improve the functioning of the computing device by enabling the computing device to more efficiently complete sets of tasks by reducing the amount of user intervention required to complete the tasks.

The following will provide, with reference to FIGS. 1, 2, 4, and 5, detailed descriptions of example systems for completing sets of computing tasks. Detailed descriptions of corresponding computer-implemented methods will also be provided in connection with FIG. 3.

FIG. 1 is a block diagram of example system 100 for completing sets of computing tasks. As illustrated in this figure, example system 100 may include one or more modules 102 for performing one or more tasks. For example, and as will be explained in greater detail below, example system 100 may include a definition module 104 that defines a set of computing tasks to be performed in a specified order. Example system 100 may additionally include a configuration module 106 that configures a set of containers such that each container within the set of containers is configured to perform a task within the set of computing tasks, where each container isolates user space of a deployment system from other software on the deployment system while sharing kernel space with the other software. Example system 100 may also include a receiving module 108 that receives a request to initiate the set of computing tasks. Example system 100 may additionally include a completion module 110 that completes, in response to the request, the set of computing tasks by launching the set of containers in the specified order. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate completing sets of computing tasks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as set of containers 122. Set of containers 122 generally represents any type or form of predefined group of containers. In one example, set of containers 122 may include a set of DOCKER containers that are each configured to complete a predefined task.

Figure 2:
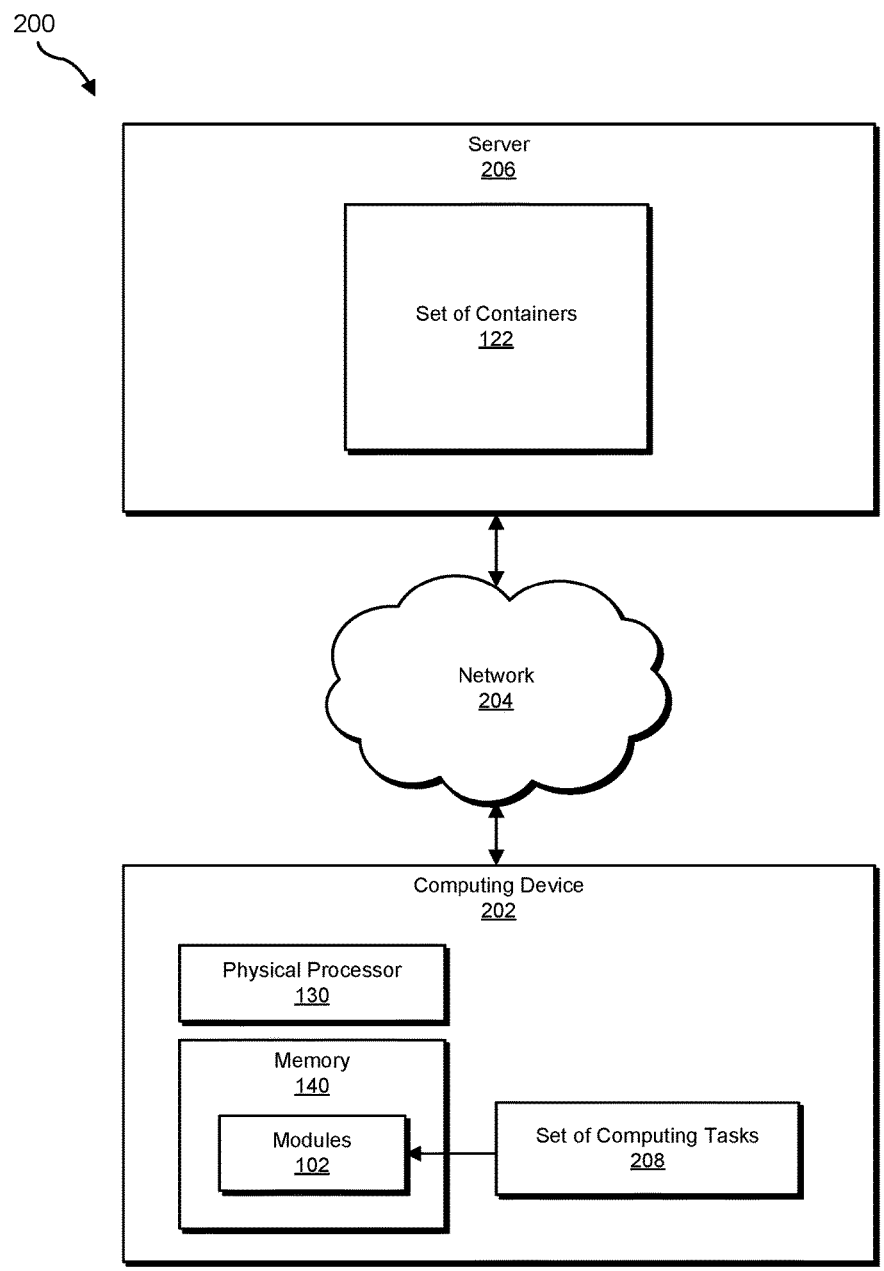
FIG. 2 is a block diagram of an additional example system for completing sets of computing tasks.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to complete sets of computing tasks. For example, and as will be described in greater detail below, definition module 104 may define a set of computing tasks 208 to be performed in a specified order. Next, configuration module 106 may configure set of containers 122 such that each container within set of containers 122 is configured to perform a task within set of computing tasks 208, where each container isolates user space of a deployment system from other software on the deployment system while sharing kernel space with the other software. At some later time, receiving module 108 may receive a request to initiate set of computing tasks 208. After the request is received, completion module 110 may complete, in response to the request, set of computing tasks 208 by launching set of containers 122 in the specified order.

Computing device 202 generally represents any type or form of computing device capable of reading computer-executable instructions. In some embodiments, computing device 202 may be an end-user computing device such as a laptop or a desktop. Additional examples of computing device 202 include, without limitation, tablets, servers, cellular phones, Personal Digital Assistants (PDAs), multi-media players, embedded systems, wearable devices (e.g., smart watches, smart glasses, etc.), gaming consoles, variations or combinations of one or more of the same, and/or any other suitable computing device.

Server 206 generally represents any type or form of computing device that is capable of hosting one or more containers. In some embodiments, server 206 may represent one or more remote servers (e.g., cloud servers) that are located separately from computing device 202. In other embodiments, server 206 may represent local device. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In some embodiments, any or all of the elements illustrated on server 206 may instead be located on computing device 202.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Set of computing tasks 208 generally represents any type or form of predefined group of computing tasks. In some examples, set of computing tasks 208 may include a series of tasks that complete a process, such as the series of tasks necessary to prepare data in a database for analysis.

Figure 3:
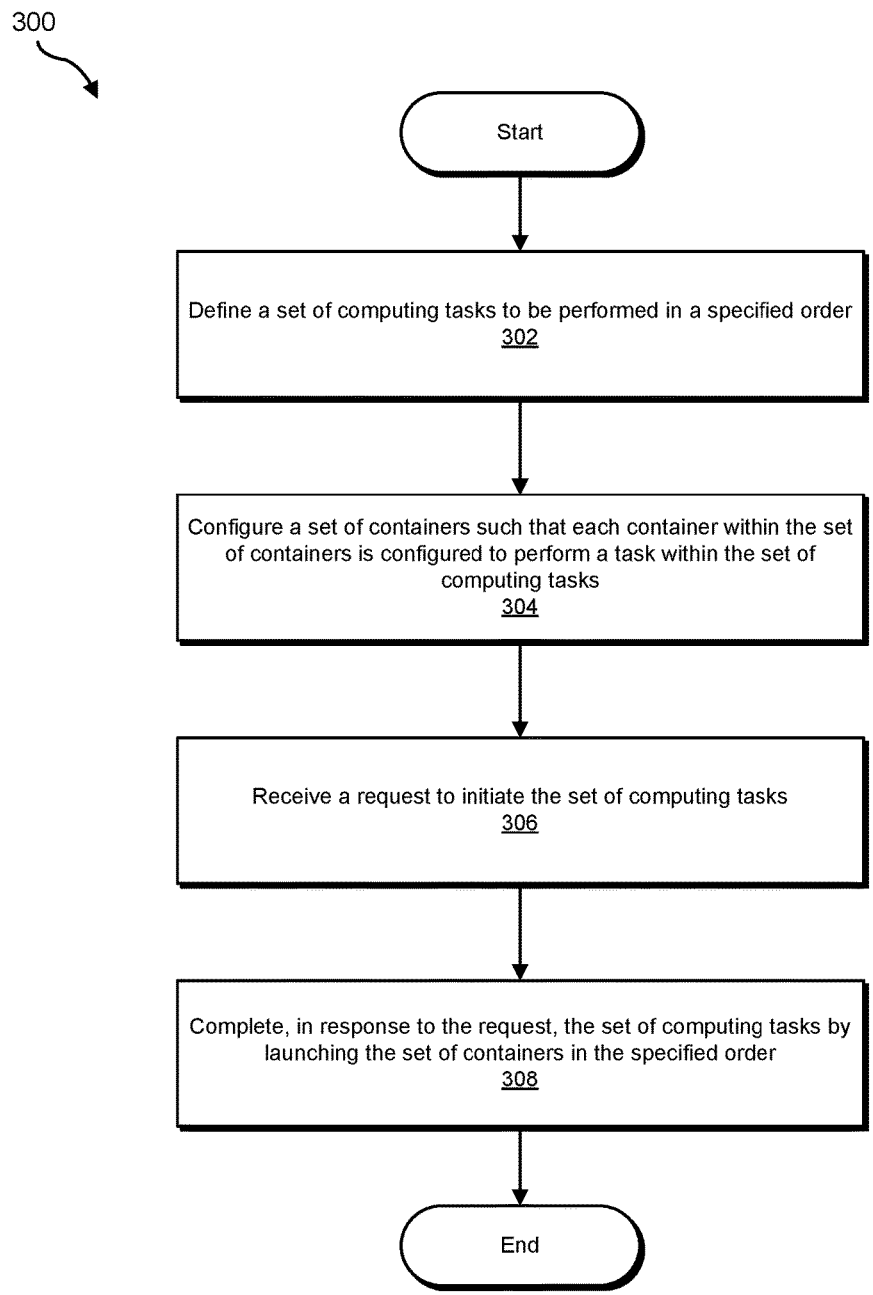
FIG. 3 is a flow diagram of an example method for completing sets of computing tasks.

FIG. 3 is a flow diagram of an example computer-implemented method 300 for completing sets of computing tasks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may define a set of computing tasks to be performed in a specified order. For example, definition module 104 may, as part of computing device 202 in FIG. 2, define set of computing tasks 208 to be performed in a specified order.

The term "computing task" or "task," as used herein, generally refers to any action that can be carried out by a computing system. Examples of computing tasks include, without limitation, transmitting data, transforming data, deleting data, logging data, creating data, executing scripts, processes, or applications, and/or analyzing data.

The term "specified order," as used herein, generally refers to any way of describing a sequence in which a series of events should occur. In some examples, a specified order may specify how a series of tasks should be performed consecutively. For example, a specified order may specify that tasks should be performed in the order of task A, then task B, then task C, and then task D. In other examples, a specified order may specify that some tasks may or must be performed concurrently. For example, a specified order may specify that tasks should be performed in the order of task A, then tasks B and C concurrently, then task D. Additionally or alternatively, a specified order may specify that while some tasks must be completed before other tasks, some tasks may be completed in any order. For example, a specified order may specify that tasks should be performed in the order of task A, then tasks B and C in any order, then task D.

Definition module 104 may define the series of computing tasks and/or the specified order in any way. For example, definition module 104 may receive input from a user specifying the series of computing tasks and/or the specified order. In some embodiments, definition module 104 may receive user input via a specialized interface created to enable users to define series of computing tasks and/or specified orders for those computing tasks. For example, definition module 104 may receive the user input via an interface that allows a user to make selections from a predefined list of tasks and/or enter instructions for performing new tasks not on the predefined list. In some embodiments, definition module 104 may enable a user to create a saved series of tasks that have a specified order with a name and/or description. For example, definition module 104 may enable a user to define a series of tasks that includes extracting data from a database, transforming the data to a specified format, and analyzing the data using an analysis tool, name the series of tasks "email analysis workflow," and/or add a description to the series of tasks such as, "Extract email data for the last month and produce a report with top keywords."

At step 304, one or more of the systems described herein may configure a set of containers such that each container within the set of containers is configured to perform a task within the set of computing tasks. For example, configuration module 106 may, as part of computing device 202 in FIG. 2, configure set of containers 122 such that each container within set of containers 122 is configured to perform a task within set of computing tasks 208, where each container isolates user space of a deployment system from other software on the deployment system while sharing kernel space with the other software.

The term "container," as used herein, generally refers to any type of virtual environment that does not include an entire operating system but does include enough computing resources to execute at least one process and/or application. In some embodiments, the resources and/or processes within an application container may be isolated from resources and/or processes outside the application container. For example, a container may isolate user space of a deployment system from other software on the deployment system while sharing kernel space with the other software. The term "user space," as used herein, generally refers to the portion of memory in a computing environment where application software executes. In some embodiments, user space may include libraries, graphics engines, device drivers for certain devices, and/or system daemons. The term "kernel space," as used herein, generally refers to the portion of memory in a computing environment reserved for executing an operating system kernel, kernel extensions, and device drivers. In contrast, virtualization environments that are not containers, such as virtual machines, may not share kernel space with other software. Other forms of application virtualization that are also not containers may share both kernel space and user space with other applications. In some embodiments, a container may execute only a single process and/or application, while in other embodiments, a container may execute multiple processes and/or applications.

Configuration module 106 may configure the set of containers in a variety of ways. For example, configuration module 106 may use templates, configuration files, container images, and/or other container configuration tools to configure each container in the set of containers to perform a task in the set of tasks. In some embodiments, configuration module 106 may configure a workflow driver that launches the set of containers and/or any additional resources needed by the set of containers, stores the specified order in which the containers should be launched, and/or handles errors that may arise in the execution of the computing tasks. In some embodiments, the workflow driver may be hosted in a container. Additionally or alternatively, the workflow driver may declare storage volumes and/or networks that are required by the set of containers to complete the set of tasks.

Figure 4:
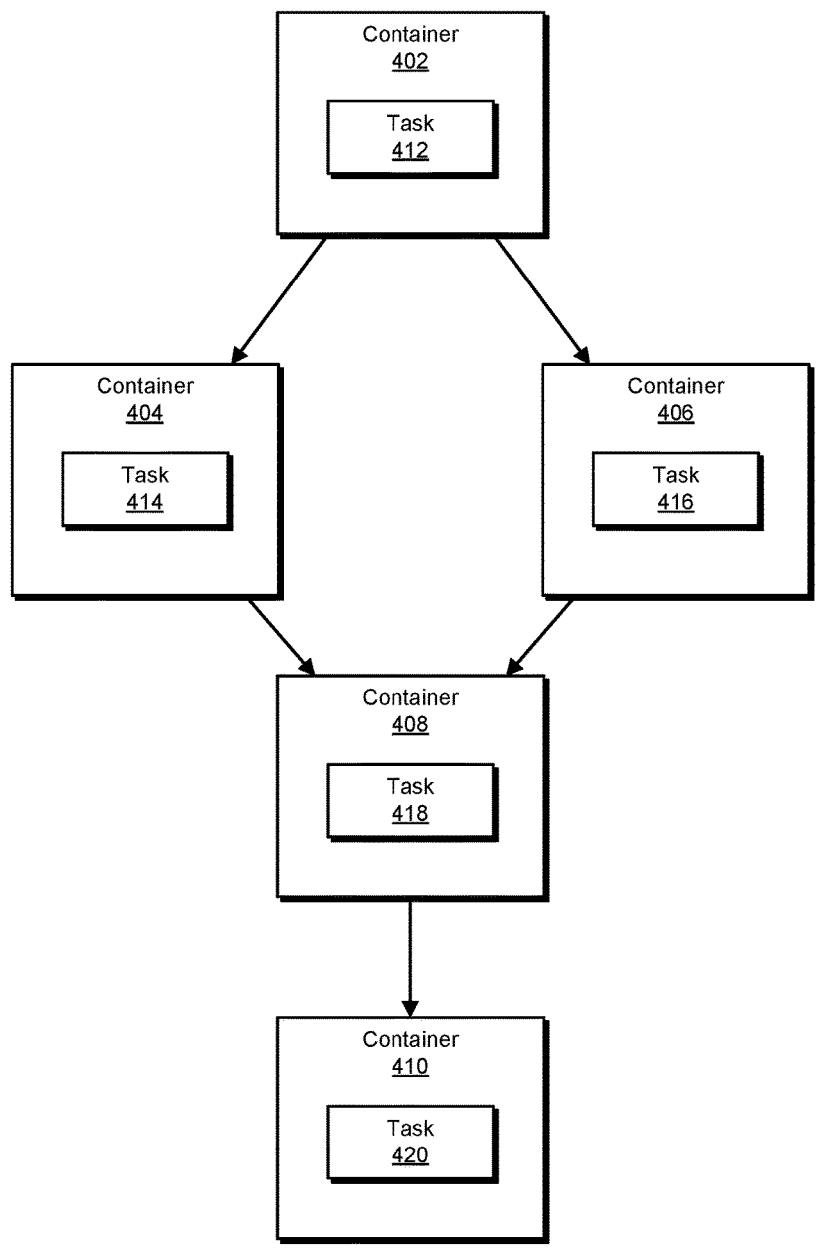
FIG. 4 is a block diagram of an example computing system for completing sets of computing tasks.

In some embodiments, configuration module 106 may configure the set of containers to execute in the specified order to perform the set of tasks. For example, as illustrated in FIG. 4, configuration module 106 may configure a container 402 to perform a task 412. Configuration module 106 may also configure containers 404 and 406 to perform tasks 414 and 416 concurrently after container 402 has performed task 412. Configuration module 106 may configure a container 408 to perform a task 418 after containers 404 and 406 have completed tasks 414 and 416, respectively. Configuration module 106 may also configure a container 410 to complete a task 420 after container 408 has completed task 418. Configuration module 106 may configure the containers in any order. For example, configuration 106 module may configure container 410 before configuring container 408 even though container 408 must complete task 418 before container 410 can begin task 420.

Returning to FIG. 3, at step 306, one or more of the systems described herein may receive a request to initiate the set of computing tasks. For example, receiving module 108 may, as part of computing device 202 in FIG. 2, receive a request to initiate set of computing tasks 208.

Receiving module 108 may receive the request in a variety of ways and contexts. For example, receiving module 108 may receive the request from a user. In some embodiments, receiving module 108 may receive a request from a user via an interface designed to enable the user to select from various predefined sets of computing tasks and easily initialize their chosen set of computing tasks. In some embodiments, receiving module 108 may include a graphical user interface (GUI) that enables users to request the completion of sets of tasks and/or configure sets of tasks. In another example, receiving module 108 may receive a request from another application and/or process. In one example, receiving module 108 may receive a request for a set of computing tasks from a process at regularly scheduled intervals. For example, receiving module 108 may receive a request each day at the same time to perform a set of tasks to transform data that has been collected over the past day and stored in a database.

At step 308, one or more of the systems described herein may complete, in response to the request, the set of computing tasks by launching the set of containers in the specified order. For example, completion module 110 may, as part of computing device 202 in FIG. 2, complete, in response to the request, set of computing tasks 208 by launching set of containers 122 in the specified order.

Completion module 110 may launch the set of containers in a variety of ways. For example, completion module 110 may be part of a workflow driver that may launch the set of containers and/or other resources required to complete the set of tasks, such as databases, storage volumes, processes not within a container, and/or interfaces. In some embodiments, the workflow driver may be hosted within a container. In one embodiment, containers within the set of containers may communicate with each other and/or the workflow driver via a message queue. In this embodiment, the workflow driver may coordinate the completion of tasks and the starting of containers to complete the next task and/or may end the execution of the set of containers when all of the tasks have been completed. In some examples, the systems described herein may leave one or more containers in the set of containers running after all of the tasks in the set of tasks have been completed. For example, one of the containers may host an application that a user may wish to access, such as an analytics tool or a report.

Figure 5:
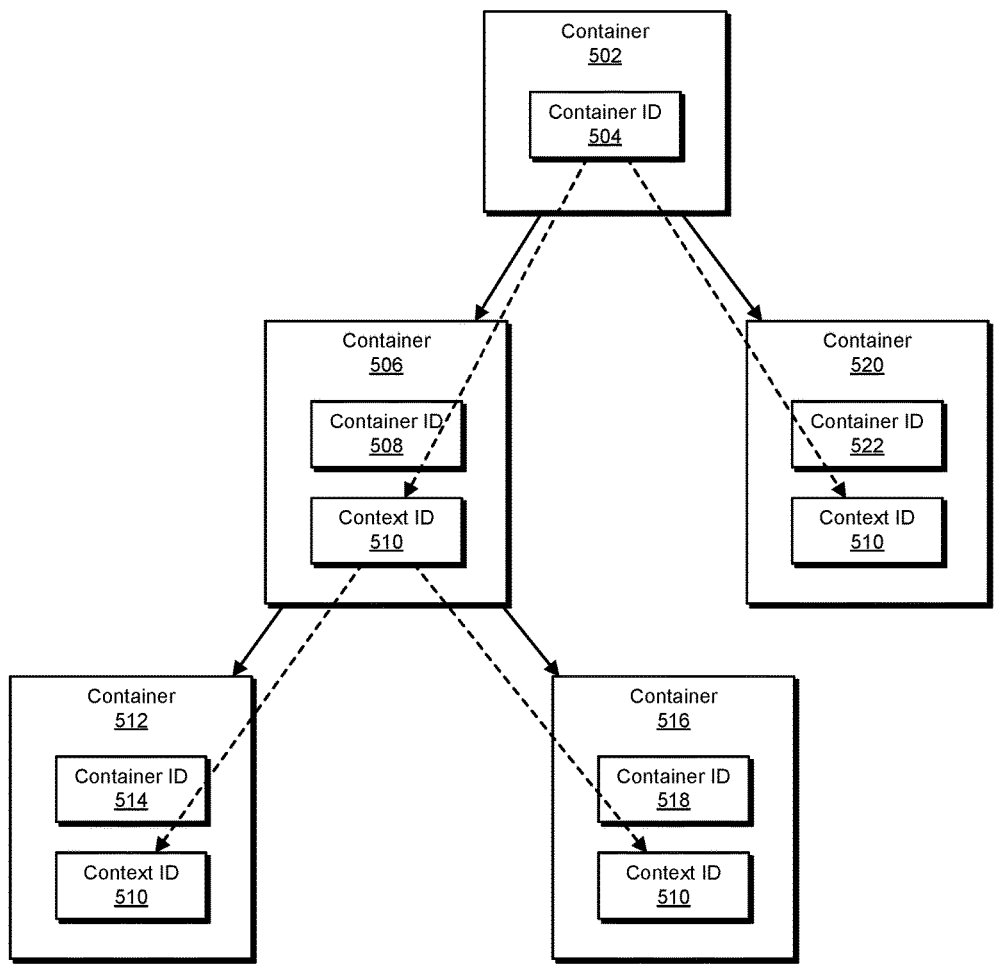
FIG. 5 is a block diagram of an example computing system for completing sets of computing tasks.

In some examples, completion module 110 may launch the set of containers in the specified order by launching, by a container in the set of containers, at least one other container in the set of containers. In some embodiments, any container that launches another container may assign a context identifier (ID) to the launched container. In one embodiment, if a container has a context ID, it may assign the context ID to any launched containers and if the container does not have a context ID, it may assign its own container ID to any launched containers as a context ID. For example, as illustrated in FIG. 5, a container 502 may have a container ID 504 but may not have a context ID. In some embodiments, containers may not have context IDs by default but may have container IDs by default. In one example, container 502 may launch a container 506 and a container 520. Because container 502 does not have a context ID, container 502 may assign its container ID to containers 506 and/or 520 as a context ID. For example, if container ID 504 has the value "1234" then context ID 510 will also have the value "1234." Container 506 may have context ID 510 assigned by container 502 and may also have its own container ID 508. Similarly, container 520 may have the same context ID 510 assigned by container 502 but may have its own container ID 522. In some examples, container 506 may then launch containers 512 and/or 516. Because container 506 has context ID 510, container 506 may assign context ID 510 to containers 512 and/or 516. Containers 512 and 516 may also have their own container IDs 514 and 518 respectively. If containers 512 and/or 516 launch any additional containers, they may also assign context ID 510 to those containers. Container and/or context IDs may include any type of alphanumeric string. In some embodiments, a container ID may include a process ID for the process that represents the container.

By assigning context IDs in this way, the systems described herein may be able to track the activity of related containers. For example, the systems described herein may collect all of the errors, successes, and/or log information generated by containers with the same context ID in order to present an overall view of all the information generated by a set of computing tasks. In another example, the systems described herein may monitor containers with the same context ID and/or may declare a set of computing tasks completed if all containers with that container ID have ceased execution. In some embodiments, the systems described herein may assign and/or track context IDs by means of configuration files that configure each container. In one embodiment, the containers may be DOCKER containers and the context ID may be assigned by means of the docker-compose file for each container instance.

In some embodiments, the systems described herein may make use of resources outside of containers. In some examples, completion module 110 may launch an external resource that is not contained within any container in the set of containers. For example, completion module 110 may launch a database, process, and/or a storage volume. In another example, completion module 110 may launch a container that is not part of the set of containers. In some embodiments, a workflow driver that also launches the set of containers may launch the external resource.

Additionally or alternatively, completion module 110 may launch the external resource by launching, by a container in the set of containers, the external resource. For example, one of the containers in the set of containers may launch a database. In another example, one of the containers in the set of containers may launch a user interface that prompts a user to provide input. In this example, the container may wait until the user has provided the input before completing the computing task assigned to the container. In some examples, receiving input from a user may be the computing task assigned to the container.

The systems described herein may complete a variety of different types of tasks. In some embodiments, the tasks completed by the systems described herein may be part of an extract, transform, and load (ETL) process that extracts data from storage, transforms the data in some way, and stores the data in a new location. In one example, completion module 110 may complete a series of tasks to extract and analyze a database. In this example, the systems described herein may launch a first container that may extract a database from an archived database image. The systems described herein may then launch a second container that transforms the extracted database into a generic markup language. The systems described herein may then launch two containers that run in parallel: one that processes the generic markup language file and outputs a file formatted to be read by an analytics program and another that outputs information about the data to a search service. Finally, the systems described herein may launch a fifth container that examines the amount of disk space used for each step and reports the disk space information to a telemetric database. In some embodiments, the systems described herein may also facilitate the temporary creation and removal of memory areas used to store the intermediate data structures such as the generic markup language file.

Additionally or alternatively, the systems described herein may complete sets of tasks that don't adhere strictly to an ETL process. In one example, completion module 110 may complete a set of tasks that enable a user to access information in a file. In this example, the systems described herein may launch a first container that may load a file into a database. In some embodiments, completion module 110 may also launch a workflow driver that may launch the database so that the first container can access the database. The systems described herein may then launch a second container that may execute an application that can access databases and may configure the application to read from the database used by the first container. In this example, the systems described herein may leave the second container running until cancelled by a user so that the user can use the application to access the database.

As explained in connection with method 300 above, the systems and methods described herein may enable users to easily complete multi-step processes by configuring a set of containers to each complete a step within the process. In some embodiments, the systems described herein may enable users to complete ETL processes. In these embodiments one container may extract the data, one or more containers may transform the data into one or more formats, and one or more containers may load the transformed data into new locations. By configuring containers to perform each step in the ETL process, the systems described herein may allow users to easily perform ETL processes simply by selecting the relevant pre-configured set of containers rather than manually launching and/or configuring each step of the process each time.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing task to be transformed, transform the computing task data into a set of containers to perform the computing tasks, output a result of the transformation to a system that manages stored sets of containers, use the result of the transformation to perform the set of computing tasks, and store the result of the transformation to a container management system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for completing sets of computing tasks, at least a portion of the method being performed by a computing device comprising at least one processor, the method comprising:

defining a set of computing tasks to be performed in a specified order;
configuring a set of containers such that each container within the set of containers is configured to perform a task within the set of computing tasks, wherein each container isolates user space of a deployment system from other software on the deployment system while sharing kernel space with the other software;
receiving a request to initiate the set of computing tasks; and
completing, in response to the request, the set of computing tasks by launching the set of containers in the specified order comprising:
    launching a first container in the set of containers, the launching causing the first container to perform a first task; and
    launching, by the first container, a second container included in the set of containers, the launching causing the second container to perform a second task after the first container has completed performing the first task.

2. The computer-implemented method of claim 1,
wherein a container in the set of containers comprises a container identifier;
wherein launching the set of containers in the specified order comprises launching, by the container, at least one other container in the set of containers by assigning a context identifier to the other container that comprises the container identifier, and
wherein the other container launches an additional container within the set of containers by assigning a context identifier to the additional container that comprises the context identifier of the other container.

3. The computer-implemented method of claim 1, wherein:
the first container comprises a first container identifier; and
launching, by the first container, the second container further comprises assigning, by the first container, a first context identifier to the second container that comprises the first container identifier.

4. The computer-implemented method of claim 3, wherein:
the second container does not comprise an assigned context identifier; and
the first container assigns the first context identifier that comprises the first container identifier to the second container based on determining that the second container does not comprise the assigned context identifier.

5. The computer-implemented method of claim 1, wherein launching the set of containers in the specified order comprises launching an external resource that is not contained within any container in the set of containers.

6. The computer-implemented method of claim 5, wherein launching the external resource comprises launching, by a container in the set of containers, the external resource.

7. The computer-implemented method of claim 1, wherein completing the set of computing tasks comprises:
launching, by at least one container in the set of containers, an interface that prompts a user to provide input; and
receiving, from the user via the interface, the input.

8. A system for completing sets of computing tasks, the system comprising:
a definition module, stored in memory, that defines a set of computing tasks to be performed in a specified order;
a configuration module, stored in memory, that configures a set of containers such that each container within the set of containers is configured to perform a task within the set of computing tasks, wherein each container isolates user space of a deployment system from other software on the deployment system while sharing kernel space with the other software;
a receiving module, stored in memory, that receives a request to initiate the set of computing tasks;
a completion module, stored in memory, that completes, in response to the request, the set of computing tasks by launching the set of containers in the specified order comprising:
    launching a first container in the set of containers, the launching causing the first container to perform a first task; and
    launching, by the first container, a second container included in the set of containers, the launching causing the second container to perform a second task after the first container has completed performing the first task; and
at least one physical processor configured to execute the definition module, the configuration module, the receiving module, and the completion module.

9. The system of claim 8,
wherein a container in the set of containers comprises a container identifier,
wherein the completion module launches the set of containers in the specified order by launching, by the container, at least one other container in the set of containers by assigning a context identifier to the other container that comprises the container identifier, and
wherein the other container launches an additional container within the set of containers by assigning a context identifier to the additional container that comprises the context identifier of the other container.

10. The system of claim 8, wherein:
the first container comprises a first container identifier; and
launching, by the first container, the second container further comprises assigning, by the first container, a first context identifier to the second container that comprises the first container identifier.

11. The system of claim 10, wherein:
the second container does not comprise an assigned context identifier; and
the first container assigns the first context identifier that comprises the first container identifier to the second container based on determining that the second container does not comprise the assigned context identifier.

12. The system of claim 8, wherein the completion module launches the set of containers in the specified order by launching an external resource that is not contained within any container in the set of containers.

13. The system of claim 12, wherein the completion module launches the external resource by launching, by a container in the set of containers, the external resource.

14. The system of claim 8, wherein the completion module completes the set of computing tasks by:
launching, by at least one container in the set of containers, an interface that prompts a user to provide input; and
receiving, from the user via the interface, the input.

15. A non-transitory computer-readable medium comprising one or more computer-readable instructions that, when executed by at least one processor of a computing device, cause the computing device to:

define a set of computing tasks to be performed in a specified order;
configure a set of containers such that each container within the set of containers is configured to perform a task within the set of computing tasks, wherein each container isolates user space of a deployment system from other software on the deployment system while sharing kernel space with the other software;
receive a request to initiate the set of computing tasks; and
complete, in response to the request, the set of computing tasks by launching the set of containers in the specified order comprising:
  launching a first container in the set of containers, the launching causing the first container to perform a first task; and
  launching, by the first container, a second container included in the set of containers, the launching causing the second container to perform a second task after the first container has completed performing the first task.

16. The non-transitory computer-readable medium of claim 15, wherein:
  the first container comprises a first container identifier; and
  launching, by the first container, the second container further comprises assigning, by the first container, a first context identifier to the second container that comprises the first container identifier.

17. The non-transitory computer-readable medium of claim 16, wherein the second container launches an additional container within the set of containers by assigning a second context identifier to the additional container that comprises the first context identifier of the second container.

* * * * *